(12) United States Patent
Van De Veerdonk

(10) Patent No.: US 10,745,200 B2
(45) Date of Patent: Aug. 18, 2020

(54) METHOD AND SYSTEM FOR COMMISSIONING PRODUCTS

(71) Applicant: VANDERLANDE INDUSTRIES B.V., Veghel (NL)

(72) Inventor: Wilco Johannes Adrianus Anthonius Van De Veerdonk, Veghel (NL)

(73) Assignee: VANDERLANDE INDUSTRIES B.V., Veghel (NL)

( * ) Notice: Subject to any disclaimer, the term of this patent is extended or adjusted under 35 U.S.C. 154(b) by 31 days.

(21) Appl. No.: 15/984,852

(22) Filed: May 21, 2018

(65) Prior Publication Data

US 2018/0265299 A1 Sep. 20, 2018

Related U.S. Application Data

(63) Continuation of application No. 14/442,151, filed as application No. PCT/NL2013/050815 on Nov. 13, 2013, now Pat. No. 10,071,858.

(30) Foreign Application Priority Data

Nov. 15, 2012 (NL) ..................................... 2009818

(51) Int. Cl.
*B65G 1/00* (2006.01)
*B65G 1/137* (2006.01)
*G05B 19/042* (2006.01)
*G06Q 10/08* (2012.01)

(52) U.S. Cl.
CPC ......... *B65G 1/1378* (2013.01); *G05B 19/042* (2013.01); *G06Q 10/087* (2013.01); *B65G 2209/08* (2013.01); *G05B 2219/2621* (2013.01)

(58) Field of Classification Search
CPC .................................................... B65G 1/0421
USPC ........................................ 414/807, 273, 274
See application file for complete search history.

(56) References Cited

U.S. PATENT DOCUMENTS

| 2004/0037680 A1 | 2/2004 | Sato et al. |
| 2004/0191049 A1 | 9/2004 | Winkler et al. |
| 2009/0129902 A1 | 5/2009 | Schafer et al. |
| 2009/0136328 A1 | 5/2009 | Schafer et al. |
| 2010/0316468 A1 | 12/2010 | Lert |

(Continued)

FOREIGN PATENT DOCUMENTS

| CN | 1486912 | 4/2004 |
| CN | 102092577 | 6/2011 |

(Continued)

*Primary Examiner* — Saul Rodriguez
*Assistant Examiner* — Willie Berry, Jr.
(74) *Attorney, Agent, or Firm* — Barnes & Thornburg LLP; Mark J. Nahnsen

(57) ABSTRACT

A method for collecting products listed in an order in a product collecting system having a plurality of modules, the method including: assigning the order to a module, allocating a product listed in the order to the order if the product is already available in the module, allocating a product to the order from another module if the product of the "slow-moving" type is not already available in the module whereas it is available in the other module, allocating a product to the order from a pallet warehouse if the product of the "slow-moving" type is not already available in the module nor in another module, and releasing the order and loading the products onto a collecting carrier when all the products listed in the order have been collected in the module.

14 Claims, 2 Drawing Sheets

(56) References Cited

U.S. PATENT DOCUMENTS

Figure 2A:
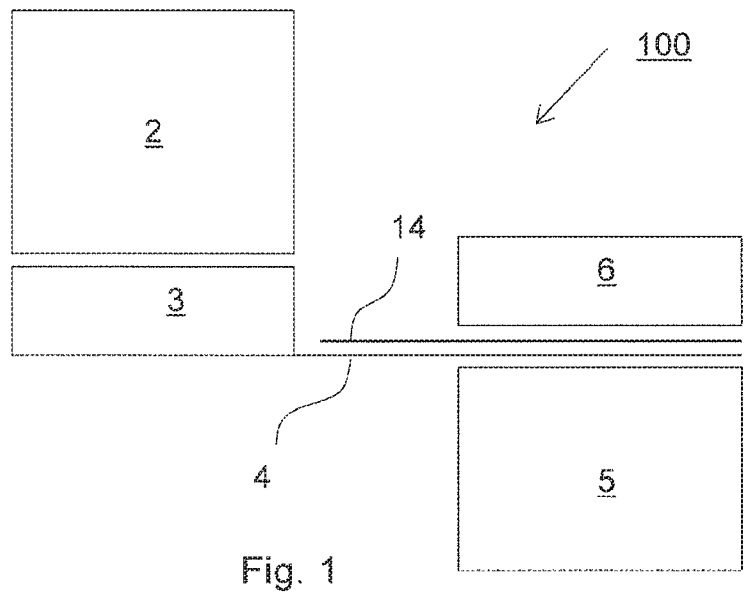

| | | |
|---|---|---|
| 2011/0106295 A1 | 5/2011 | Miranda et al. |
| 2011/0125694 A1 | 5/2011 | Holzner et al. |
| 2013/0223959 A1 | 8/2013 | Koholka |
| 2014/0163721 A1 | 6/2014 | Ogawa et al. |

FOREIGN PATENT DOCUMENTS

| | | |
|---|---|---|
| DE | 102006025619 | 11/2007 |
| DE | 102006025620 | 11/2007 |
| DE | 102011104511 | 10/2012 |
| EP | 1462394 | 9/2004 |
| WO | WO 2009/143548 | 12/2009 |
| WO | WO 2011/113053 | 9/2011 |
| WO | WO 2012/069327 | 5/2012 |
| WO | WO 2012/147261 | 11/2012 |

METHOD AND SYSTEM FOR COMMISSIONING PRODUCTS

CROSS REFERENCE TO RELATED APPLICATIONS

This application is a Continuation of co-pending U.S. application Ser. No. 14/442,151, filed May 12, 2015, which is a a U.S. nationalization under 35 U.S.C. § 371 of International Application No. PCT/NL2013/050815, filed Nov. 13, 2013, which claims priority to Netherlands Patent Application No. 2009818, filed Nov. 15, 2012. The disclosures set forth in the referenced applications are incorporated herein by reference in their entireties.

DESCRIPTION

The present invention relates to a method for collecting a number of different products listed in an order in a product collecting system.

The present invention also relates to a product collecting system for collecting a number of different products listed in an order.

The method according to the invention in particular relates to the collecting of products for the retail trade. The retail trade is characterised by a large amount of different (consumer) products, and orders to be collected are known at a relatively early stage.

A known product collecting system comprises a product warehouse with a number of racks extending parallel to each other, each rack comprising a number of rack positions arranged beside and above each other for storing a product therein, a number of collecting stations for collecting products listed in the order on a collecting carrier, and an endless loop conveyor designed for conveying products along the racks and the collecting stations. In a known method for collecting products listed in an order, which is used in the known product collecting system, products listed in an order to be collected at a collecting station are removed from rack positions from various racks of the product warehouse and placed on the loop conveyor. When a product listed in the order passes the collecting station in question, the products is taken off the loop conveyor and loaded onto a product container at the collecting station. The supply of products from a pallet supplied from a pallet warehouse, which products are to be stored in the product warehouse, likewise takes place via the loop conveyor.

A drawback of the above-described known method is that it is inefficient, as the process of removing products listed in an order from the product warehouse up to and including stacking the products listed in the order on a collecting carrier at a collecting station takes up a relatively great deal of time, i.e. a high system capacity is required in order to obtain a sufficiently high output of products.

It is an object of the present invention to provide a method by means of which products listed in an order are collected in an efficient manner and, as a result, can be loaded onto a collecting carrier in a relatively short period of time at a collecting station.

The above object is achieved by the method according to the invention for collecting a number of different products listed in an order in a product collecting system, the product collecting system comprising a pallet warehouse for storage therein of product carriers, such as pallets, carrying products, a product warehouse comprising a number of racks extending parallel to each other, each rack comprising a number of rack positions arranged beside and above each other for storage therein of a product, and a number of collecting stations for collecting products listed in an order on a collecting carrier, wherein modules are defined in the product collecting system, each module at least comprising a number of adjacent rack positions of a rack and a collecting station, the order at least comprising products of the "slow-moving" type, or at least of a first type, the method comprising the steps of:

a) allocating the order to a module;
b) collecting all the products listed in the order in said module, to which end at least the following steps are carried out,
   b1) allocating to the order a product listed in the order if it is determined that said product is already available in the module,
   b2) allocating to the order a product listed in the order if said product is of the "slow-moving" type and it is determined that said product is not already available in the module whereas it is available in another module, and moving said product from said other module to the module, and
   b3) unloading a product carrier carrying a product listed in the order at least in part if said product is of the "slow-moving" type and it is determined that said product is not already available in the module nor in another module, in which case the product in question is allocated to the order and moved to the module,
c) releasing the order when all the products listed in the order have been collected in the module and been allocated to the order, and loading the products onto at least one collecting carrier at the collecting station. To that end, the products allocated to the order, which are present in rack positions of the module, can be conveyed to the collecting station, preferably via a conveyor that is designed for conveying products directly from the product warehouse to the collecting station, preferably from a transfer position associated with a rack, wherein the product is removed from a rack position, for example by means of a warehouse crane, and conveyed to said transfer position.

An advantage of the method according to the invention is the fact that the collecting of products can take place in a highly efficient manner by subdividing the product warehouse into a number of separate modules, each comprising at least a number of adjacent rack positions and a collecting station, wherein products of the "slow-moving" type which are not already available in a module allocated to the order in question are either moved to the module from another module, if available in said other module, or taken from a product carrier such as a pallet from the pallet warehouse. Within the framework of the present invention, the word "available" thus means that a particular product may not have been allocated to another order yet. The required capacity of the first part, i.e. the product conveying means, such as product conveyors, is relatively limited, which has an advantageous effect on the cost price of a product collecting system to which the method relates. Moreover, products listed in the order can be supplied very quickly to a collecting carrier to be filled at a collecting station, since all the products have already been collected at one location, i.e. in one module. Consequently there will be no delays caused by variations in the conveying time of a product from a random rack position somewhere in the warehouse to the collecting station.

The product warehouse is preferably a so-called "Automated Storage & Retrieval System". In the warehouse, warehouse cranes may be provided between the racks for placing products into rack positions and removing them therefrom, which warehouse cranes may be connected to a supply and discharge conveyor system via stationary lifts. Instead of using warehouse cranes it is also conceivable to use a shuttle-based system with shuttles at various levels.

In a known product collecting system as described above it is further known to use a so-called sequencer disposed separate from the product warehouse for each collecting station, said sequencer being a buffer installation for temporarily buffering products listed in the order directly before the products are supplied to the collecting station.

Such an additional sequencer, which is a costly device, is not needed in the method according to the invention, because racks of the product storage warehouse themselves are used for the storage of products of a particular order. As a result, the average number of product conveying operations per order will decrease, resulting in a reduced system load.

It is further noted that CE 10 2011 104 511 B3 discloses a method wherein—for a collection of several orders, each comprising a number of different products—for each product of an order being processed not merely the number of items of each of the products of an order that are needed for that order are taken from a warehouse and stored in a buffer, but the number of items of the product in question that are needed for the total of all orders from the collection of orders. The result is that a particular number of identical products must be collected from the warehouse each time the buffer is to be filled anew for a new collection of orders, which is inefficient.

In a very advantageous embodiment of the method according to the invention, in which the products listed in the order also comprise products of the "fast-moving" type, which are products that are needed relatively often for an order in comparison with products of the "slow-moving" type, step b) also comprises the step of b4) unloading a product carrier carrying a product listed in the order at least in part if said product is of the "fast-moving" type and it is determined that said product is not already available in the module, irrespective of the fact whether said product is available in another module, in which case the product in question is allocated to the order and moved to the module. Preferably, the product carrier is unloaded at the pallet warehouse, for example at the location of an unloading system present therein.

In the retail industry, the term "fast-moving" products is used to denote products that are sold frequently, such as the better-known brands of soft drinks and coffee. The term "slow-moving" products as used in the retail industry refers to products that are sold much less frequently. All the products of the total product range of products to be stored in the product warehouse can be classed as being of the "slow-moving" type or the "fast-moving" type, although it is also quite conceivable within the framework of the present invention that all the products of an order are determined to be products of the "slow-moving" type, or at least of a first type, i.e. that all the products listed in the order are exclusively of the "slow-moving" type, or at least of a first type. The division of products into products of the "slow-moving" type and products of the "fast-moving" type can for example be made on the basis of the "Pareto" principle, which is well-known in the art, according to which a division is made, for example, in which 20% of the products are determined to be "fast-moving" products, which products occur in about 80% of the orders. The remaining 80% of the products is thus of the "slow-moving" type. With such a division of products into "slow-moving" products and "fast-moving" products, and—when collecting products of an order—by supplying a product of the "fast-moving" type which is not already available in the module directly from a product carrier, usually a pallet, in the pallet warehouse, irrespective of the fact whether said product is available in another module, the number of product conveying operations is strongly reduced, because the products of the "fast-moving" type that are stored in the various modules will anyhow be shortly collected for another order that is allocated to the module in question and need not be supplied from elsewhere, therefore. On the other hand, when products of the "slow-moving" type which have not been allocated to another order yet, i.e. which are available, are by contrast collected from other modules, if possible, such products will on the one hand not remain in the product warehouse for an undesirably long period of time, whilst on the other hand it will not be necessary to unload an entire product carrier for such a low-demand product whilst products of the kind in question are still present in the product warehouse, which would lead to an unnecessary increase of the total number of such products stored in the storage warehouse.

It is advantageous if, during the execution of step b3) and/or b4), when a product carrier carrying the product in question is at least in part unloaded, which product is allocated to the order and moved to the module, other products, preferably all other products are moved from the product carrier to the product warehouse, where they are distributed over modules, preferably evenly over all modules. This results in an amount of products not listed in an order yet, i.e. available products, which are uniformly distributed over the racks in the product warehouse. It is advantageous within this framework if it is ascertained for each module upon moving the products to the product warehouse whether available products of such product types are possibly already present in said module, wherein, if that is the case, relatively fewer products are moved to that module so as to further enhance the balanced distribution of available products of the product type in question in the product warehouse.

In an advantageous embodiment, it is ascertained, prior to the allocation of an order to a module, in which module not allocated to an order at that point in time the largest number of products not allocated to other orders, i.e. available products, for the order in question are stored, whereupon the order is allocated to that module. As a result, the number of products to be moved to the module, either from other modules or from carriers from the pallet warehouse, is minimised, which has a positive effect on the efficiency of the method and thus of the product collecting system.

Preferably, a product carrier coming from the pallet warehouse is unloaded onto trays designed for containing at least one product, which trays carrying at least one product are stored in the product warehouse, wherein a product is taken from a tray during the aforesaid method step c) in order to be loaded onto the collecting carrier.

It is furthermore advantageous if the product warehouse comprises a row of n modules indicated by incremental index numbers 1-n, wherein a first one-way product conveyor having a conveying direction that extends in the direction of the incremental index numbers, and a second one-way product conveyor having a conveying direction that extends in the opposite direction of the incremental index numbers, extend along the row of n modules, each conveyor comprising, at the location of each module, a device for moving a product from the respective conveyor to a rack of the module and vice versa, wherein, when a product of the "slow-moving" type is moved from another module to the module in method step b2), the product is to that end moved either from the other module to the module by means of the first conveyor if the index number of the other module is lower than that of the module, or from the other module to the module by means of the second conveyor if the index number of the further module is higher than that of the module. Such a configuration of one-way conveyors is advantageous for cost reasons in comparison with the use of a loop conveyor. Moreover, the product collecting system can de more easily extended with additional modules, as it is easy to increase the length of such conveyors.

It is advantageous in that case if the first one-way conveyor is also used for moving products directly coming from a product carrier to a module, which takes place during method steps b3) and b4).

It is furthermore advantageous if a module comprises two, preferably four, adjacent racks, or, in other words, if the number of adjacent rack positions concerns rack positions from two, preferably four, racks.

The present invention also relates to a product collecting system for collecting a number of different products listed in an order in accordance with a method according to the invention, comprising a pallet warehouse for storage therein of product carriers, such as pallets, carrying products, a product warehouse comprising a number of racks extending parallel to each other, each rack comprising a number of rack positions arranged beside and above each other for storage therein of a product, and a number of collecting stations for collecting products listed in an order on a collecting carrier, wherein modules are defined in the product collecting system, each module at least comprising a number of adjacent rack positions of a rack and a collecting station, the order at least comprising products of the "slow-moving" type, or at least of a first type, the product collecting system further comprising control means designed for:

a) allocating the order to a module;
b) causing all the products listed in the order to be collected in said module, to which end the control means are at least designed to
  b1) allocate to the order a product listed in the order if it is determined by the control means that said product is already available in the module,
  b2) allocate to the order a product listed in the order if it is determined by the control means that the product is of the "slow-moving" type and it is determined that said product is not already available in the module, whereas it is available in another module, and cause said product to be moved from said other module to the module, and
  b3) cause a product carrier carrying a product listed in the order to be unloaded at least in part if it is determined by the control means that said product is of the "slow-moving" type and it is determined that said product is not already available in the module nor in another module, in which case the product in question is allocated to the order and said product is caused to be moved to the module,
c) releasing the order if It is determined that all the products listed in the order have been collected in the module and been allocated to the order, and causing the products to be loaded onto at least one collecting carrier at the collecting station.

Causing the product to be moved from the other module to the module in accordance with step b2) can for example take place in that the control means are more specifically designed for controlling a warehouse crane present in another module in such a manner that the crane will remove the product from a rack position and transfer it to a transfer position, and controlling conveying means such as a product conveyor in such a manner that said conveyor will convey the product from the transfer position to the module, and preferably controlling a warehouse crane present in the module in such a manner that the crane will place the product supplied by the conveying means into a rack position of a rack of the module.

Causing a product carrier carrying said product to be unloaded at least in part in accordance with step b3), wherein the product in question is allocated to the order and said product is caused to be moved to the module, can for example take place in that the control means are more specifically designed for controlling a warehouse crane in the pallet warehouse to remove a pallet, i.e. a product carrier, from a pallet rack, controlling an unloading station to unload the product carrier at least in part and controlling product conveying means such as a product supply conveyor in such a manner that the product in question is conveyed to the module.

Causing products to be loaded onto at least one collecting carrier at the collecting station in accordance with step c) can for example take place in that the control means are more specifically designed for, for example, controlling a warehouse crane in such a manner that said crane will remove a product from a rack position and transfer it to a collect-supply conveyor, possibly via a transfer position, and controlling the collecting conveyor in such a manner that the product is directly conveyed to the collecting station by the collecting conveyor.

Advantages of the product collecting system according to the invention are analogous to the advantages of the method according to the invention.

It is advantageous in this regard if the product warehouse comprises a row of modules, wherein a first one-way product conveyor having a first conveying direction and a second one-way product conveyor having a second conveying direction opposed to that of the first conveying direction extend along the row of modules, each conveyor comprising, at the location of each module, a device for moving a product from the respective conveyor to a rack of the module, and vice versa.

Within this framework it is advantageous if the first one-way conveyor is designed for conveying products from the pallet warehouse to the product warehouse and for conveying products between individual modules, and if the second one-way conveyor is designed at least for conveying products between individual modules.

In an advantageous preferred embodiment, the product collecting system comprises a collect-supply conveyor designed for conveying products directly from a rack, or at least from a transfer position associated with said rack, of that module to a collecting station, If the collect-supply conveyor crosses the supply conveyor and/or the discharge conveyor, it will therefore be located at a higher level or a lower level than said conveyors, at least at the location of the crossing.

The present invention will now be explained in more detail by means of a description of preferred embodiments of a product collecting system according to the invention to which the method according to the present invention relates, and of a preferred embodiment of a method according to the invention.

Figure 2B:
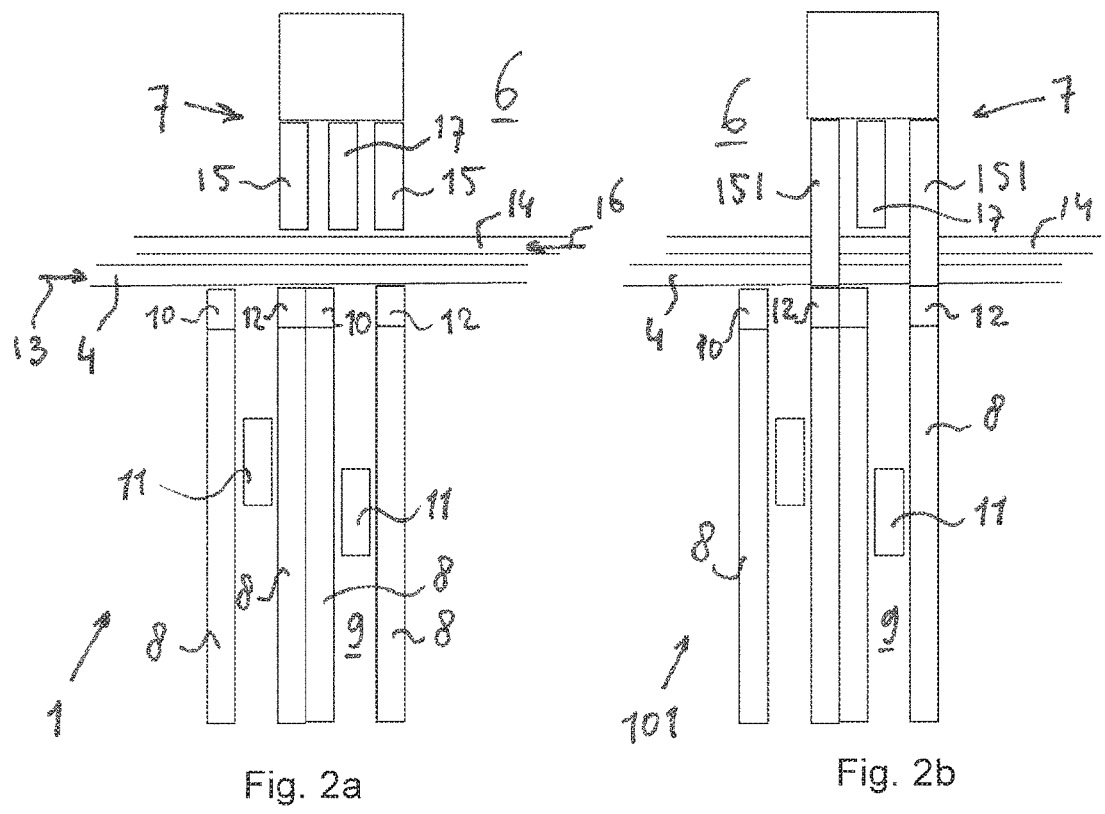
Figure 3:
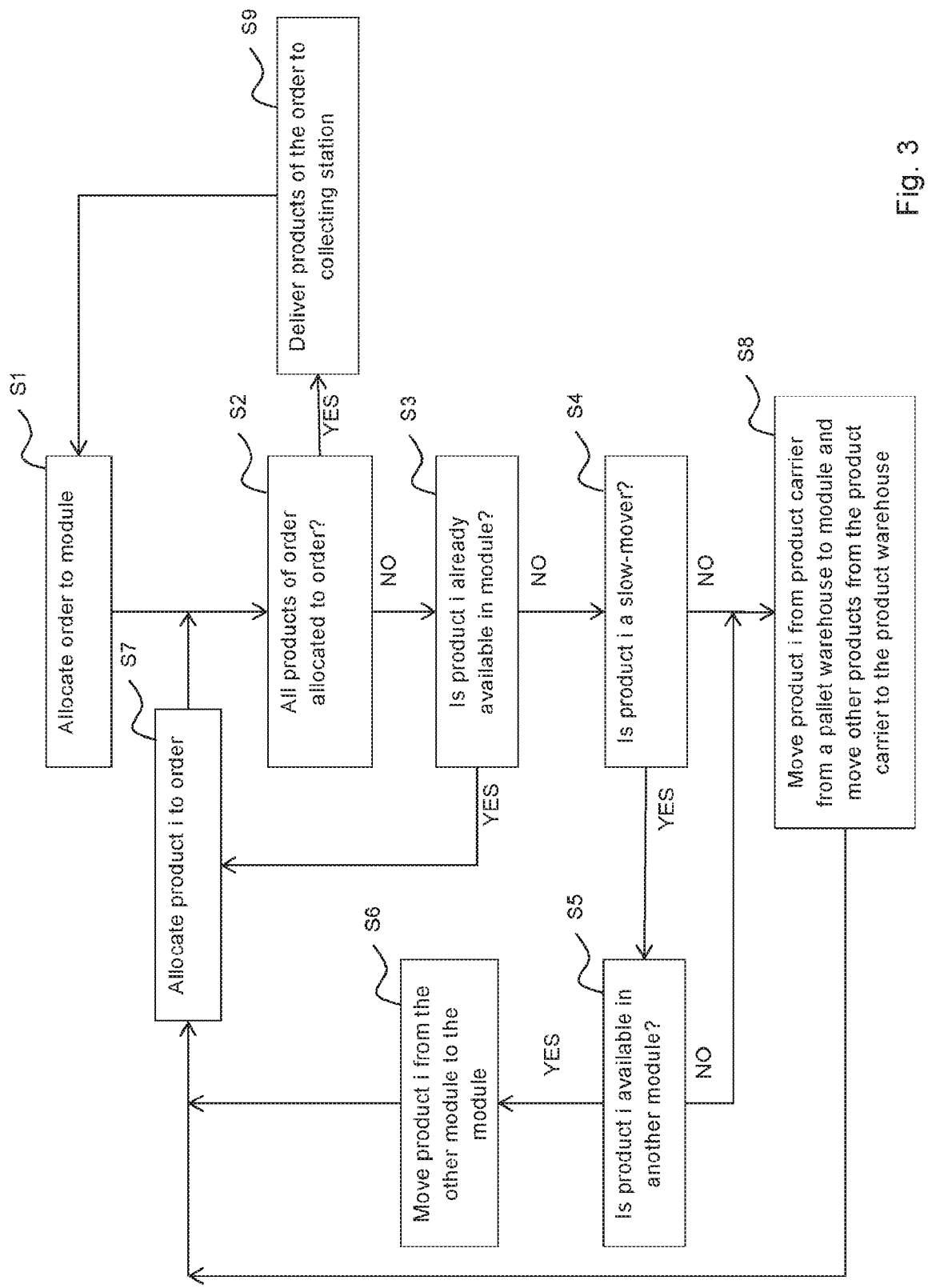

FIG. 1 schematically shows a layout of a product collecting system according to the invention, FIG. 2*a* schematically shows a preferred embodiment defined according to the method of a module that forms part of the system according to FIG. 1, FIG. 2*b* schematically shows another preferred embodiment defined according to the method of a module, and FIG. 3 shows a flow diagram of an embodiment of the method according to the invention.

In FIG. 1 there is shown a schematic layout of a product collecting system 100 according to the invention for collecting a number of different orders listed in an order in accordance with a preferred embodiment of the method according to the invention.

This system comprises a pallet warehouse 2, in which product carriers in the form of product pallets carrying identical products can be stored. At an unloading system in the form of an unstacking system 3 located near the pallet warehouse 2, product pallets are unstacked and an individual product or a few individual products are placed on a tray. The unstacking system 3 may comprise a number of individual pallet unstacking devices. The system further comprises a supply conveyor 4 for conveying the trays thus filled with products to a product warehouse 5. The use of trays is not necessary within the framework of the invention. Products can also be transferred to the supply conveyor 4 from a product carrier, such as a pallet, at the unstacking system 3 without making use of a tray, in which case the supply conveyor 4 will convey the individual products to the product warehouse 5.

In the product warehouse 5, the individual products are stored. From the product warehouse 5, products are conveyed to a collecting system 6. The collecting system 6 comprises a number of individual collecting stations 7, where the products are loaded onto collecting carriers, such as a pallet or a roll container, for example.

Within the framework of the present invention, the term "product" as used herein is understood to mean a so-called "case", which may be an individual product, or a package—for example a box-shaped package—containing one or more objects, or, for example, a plastic-wrapped pack of six PET bottles or the like, or, for example, a crate with beer bottles, or the like.

The pallet warehouse 2 comprises a number of racks extending parallel to each other, which racks comprise rack positions arranged beside and above each other, in which product pallets can be placed. A product pallet can be transported from and to a particular rack position in a rack by means of pallet cranes. At the command of a central control system, a desired product pallet is removed from a rack by a pallet crane and placed on a pallet transfer conveyor, which conveys the pallet to an unstacking device of the unstacking system 3. At the unstacking device, the pallet is unstacked onto trays either manually or automatically by an unstacker. When a tray is filled with a product supplied from a pallet, the tray is placed on the supply conveyor 4. The supply conveyor 4 is more specifically a belt conveyor, but it is also possible to use a different type of conveyor, such as a roller conveyor or the like, for conveying trays carrying a product (or a few products) from the unstacking system 3 to the product warehouse 5. The supply conveyor 4 is a one-way conveyor, which moves trays in a first conveying direction 13. See FIG. 2*a*. The product collecting system moreover comprises a discharge conveyor 14, which extends parallel to the supply conveyor 4, at least at the location of the part of the supply conveyor 4 extends along racks (to be described in more detail yet hereinafter) of the product warehouse 5. The discharge conveyor 14 is likewise a one-way conveyor, for example in the form of a belt conveyor or a roller conveyor, which moves trays in a second conveying direction 16 opposite the first conveying direction 13, back in the direction of the pallet warehouse 2. Although the discharge conveyor 14 may extend beside the supply conveyor 4, these two conveyors may also be disposed above each other or be configured as double conveyors. The collect-supply conveyor, too, may be configured as a single conveyor or as a multiple conveyor, as shown in FIG. 2*a* as a double conveyor.

As shown in FIG. 2*a*, the product warehouse 5 comprises a number of racks 8 disposed parallel to each other, each rack comprising rack positions for products (or trays carrying one or more products), which are arranged beside and above each other. An aisle 9 is provided between each pair of racks 8, in which a warehouse crane 11 is provided for placing products or trays into rack positions or removing them therefrom. A tray carrying a product, which is conveyed to the product warehouse 5 via the supply conveyor 4 of the unstacking system 3, is forced off the supply conveyor 4 and onto a tray transfer position 10 at the location of the tray transfer position 10 (or product transfer position). The tray transfer position 10 may form part of the stationary lift. The warehouse crane 11 can subsequently place said tray into a particular tray-rack position in a rack 8. In the aisle, the warehouse crane 11 can move in longitudinal direction and also, with a part thereof that is capable of manipulating a product or a tray, in vertical direction. Alternatively it is also possible to use a shuttle-based system, for example, in which shuttles designed for placing products and/or trays into rack positions and removing them therefrom can move at different levels through the aisles.

In the product collecting system, a number of modules 1 are defined, each module comprising a number of adjacent rack positions each forming part of a rack, preferably at least one rack, i.e. all or at least practically all rack positions present in a rack, four adjacent racks 8 of the product warehouse 5 in the present embodiment, each comprising a collecting station 7 of the collecting system 6. FIG. 2*a* shows an individual module 1 and also a part of the supply conveyor 4 and the discharge conveyor 14 that extends along said module. Each of the number of modules 1 can be given an index number i, with the module 1 of the present embodiment shown in FIG. 2 having index number i=5, for example, with the index number decreasing to i=1, viewed to the left in FIG. 2, which direction corresponds to the upstream direction of the supply conveyor 4, and increasing to i=10, for example, viewed to the right, which direction corresponds to the downstream direction of the supply conveyor 4. That is, ten modules 1 are disposed beside each other and contiguous to each other in the product warehouse 5 in the present embodiment, each module comprising a combination of four racks 8 and one collecting station 7.

A tray carrying a product which has been removed by means of a warehouse crane 11 from a rack position of a rack 8 of a particular module, such as a module 1 having index number i=5 shown in the figure, is put on a further tray transfer position 12 by the warehouse crane 11, which further tray transfer position optionally forms part of a stationary lift provided at a further tray transfer position 12, which may in principle be the same lift as the lift with which the tray transfer position 10 may be provided. The tray is conveyed from there to a collect-supply conveyor 15 associated with the collecting station 7 that forms part of the module 1 in question. This can take place by first putting the tray from the further tray transfer position 12 onto the supply conveyor 4 and subsequently, practically directly in practice, transferring the tray to the discharge conveyor 14 and subsequently, practically directly in practice, transferring the tray to the collect-supply conveyor 15. That is, the tray crosses the supply conveyor 4 and the discharge conveyor 14, as it were.

In an alternative advantageous embodiment of a module according to the invention, being the module 101 in FIG. 2b, the collect-supply conveyor 151 is configured so that it crosses the supply conveyor 4 and the discharge conveyor 14 at a higher level, or alternatively a lower level, and connects to the tray transfer position 12, so that it is capable of conveying trays directly from the tray transfer position 12 to the collecting station 7 without any capacity, however little, of the aforesaid conveyors 4, 14 being used. For the rest, module 101 corresponds to module 1 and accordingly parts corresponding to each other are indicated by the same numerals. In fact, the product flow from rack positions to a collecting station is separated from the product flow between respective rack positions and from the pallet warehouse to rack positions.

Products that arrive at the collecting station 7, whether or not on trays, are automatically or manually loaded onto a collecting carrier, such as a roll container, at the collecting station. Any empty trays are preferably transported back in the direction of the pallet warehouse 2 via a collect-discharge conveyor 17 and the discharge conveyor 14. If a tray arriving at the collecting station 7 should carry more products than needed for the order, the tray with the remaining products not needed at that point in time can be transported back to a rack position of a rack 8 of the module 1 via the collect-discharge conveyor 17, in a manner comparable to the supply of products as described above, albeit in reverse direction in this case.

The method according to the invention to be carried out in such a product collecting system will be explained hereinafter with reference to the flow diagram of FIG. 3.

A preferred embodiment of a method according to the invention for collecting a number of different products listed in an order in a product collecting system, such as the above-described product collecting system, relates in particular to a product collecting system for use in the retail trade. First of all, a particular collecting order to be carried out, for example an order for a roll container with a number of different products for a supermarket, is allocated to one of the modules defined in the product collecting system, such as the module 1 shown in FIG. 2 (Step S1: "Allocate order to module"). Then it is verified whether all the products listed in the order are already present in the module and have been allocated to the order (Step S2: "All products of order allocated to order?"). Because this is in principle not relevant yet at the start of the execution of the order, this step can optionally also be skipped at the start of the method. Of course there is a possibility that all the products listed in the order are already available in the module at the start of the method, but at that point in time they have not yet been allocated to the order (reserved). If the answer to the question of step 2 is NO, it is subsequently verified for a product listed in the order whether the product in question is already present in the module and is also available, i.e. usually whether the product listed in the order is already stored in a rack position associated with module 1 (Step S3: "Is product i already available in module?"). By "index i" is meant that an order can comprise n products, wherein each product can have an index number increasing from 1 to n. If YES, this product is allocated to the order (Step S7: "Allocate product i to order"). Although in theory it would occasionally be possible for all the products needed for an order to be stored already in the module 1 associated with the order, this is usually not the case in practice.

As already explained in the foregoing, products for the retail trade can usually be divided into products of a "slow-moving" type, hereinafter called "slow-movers" and products of a "fast-moving" type, hereinafter called "fast-movers".

Then it is ascertained for products not already present in the module 1 (the answer to the question in step S3 is NO, therefore), if the product in question is a slow-mover (Step S4: "is product i a slow-mover?"; the answer is YES), whether the product in question is stored in another module and has not already been allocated to another order, i.e. whether the product is available in that other module (Step S5: "Is product i available in another module?"). If that is the case, i.e. if the answer to the question of step S5 is YES, the product will be allocated to the order (Step S7), removed from the other module, conveyed to module 1 and stored in a rack position of module 1 (Step S6: "Move product i from the other module to the module"). It will be understood that the order of carrying out steps S6 and S7 does not necessarily have to be the order shown in FIG. 3, in other words, it is also possible to carry cut step S7 first and then step S6, or even to carry out step S7 while step S6 is being carried out.

If a product in a module having a higher index number is available, the product in question can be conveyed to the module 1 via the one-way discharge conveyor 14, possibly after crossing the supply conveyor 4. If a product in a module having a lower index number is available, the product in question can be conveyed to the module 1 via the one-way supply conveyor 4.

If a particular product that is needed is not "available" in another module at all (the answer in step S5 is NO), a product carrier from the pallet warehouse 2 carrying a number of identical specimens of the respective product of the "slow-moving" type will be unloaded at least in part, preferably in its entirety, and the product in question that is needed is allocated to the order (step S7) and moved to the module (Step S8: "Move product i from product carrier from a pallet warehouse to module and move other products from the product carrier to the product warehouse"), whilst other products from the pallet are preferably also moved to the product warehouse and distributed over modules there, preferably evenly distributed over the total number of modules in the product warehouse 5. As a result, the product in question is available again for further orders, preferably evenly distributed over the modules, i.e. over the product warehouse 5. As regards the order of carrying our S7 and S8, the same applies as mentioned above with regard to the order of carrying out S6 and S7.

Calculations have shown that moving fast-movers between modules is less efficient than—if a fast-mover is needed for an order and the product in question is not present in the module to which the order has been allocated—unloading the product in question directly from a product carrier carrying a number of the respective products being needed, and storing the other products from said product carriers in the product warehouse 5, distributed over the modules.

Consequently, the method according to the invention preferably comprises moving product i from a product carrier from the pallet warehouse to the module in accordance with step S8, while products listed in the order are being collected in module 1, if a product of a "fast-moving" type, i.e. a fast-mover, listed in the order is not already present in module 1 (Step S3 and Step S4, NO to both questions), wherein furthermore, according to step S7, the product in question is allocated to the order. Then it is verified again, in accordance with step S2, whether the order is already complete. The product carrier is preferably unloaded in its entirety, with the further products from the carrier being distributed over the total number of modules in the product warehouse 5 and thus being available for further orders.

Whenever a product has been allocated to the order in accordance with step S7, it is verified whether the order is now complete (S2), if not, step S3 will be carried out again as described above for a next product listed in the order, etc. If all the products listed in the order have been allocated to the order (the answer in S2 is YES), all the products will be present in the module 1. The order is complete at that point and will be released, with all the products listed in the order being conveyed to the associated collecting station 7, as explained in more detail in the above description of the system, where they are loaded onto at least one collecting carrier (step S9: "Deliver products of the order to collecting station"). Subsequently, or possibly already while products listed in an order are being conveyed to the collecting station 7, or during the loading of the collecting carrier, the module 1 will be available again for a further order and Step S1 can be carried out again. It is conceivable in this regard that when the last products or the last few products are being supplied to the module from outside the module (from another module or from a product carrier), said last few products are not first stored in a rack position of the module but directly conveyed to the collecting station of that module.

Preferably, the product collecting system is tray-based, although, as mentioned above, the product collecting system can also be operated without using trays. The term "tray" as used in the foregoing is to be read as "product" in that case. If the system is tray-based, it is advantageous within the framework of the method if a product carrier, such as a pallet, from the pallet warehouse 2 is unloaded onto trays designed for carrying at least one product, which trays carrying at least one product are stored in the product warehouse 5. Finally, a product can be taken from a tray at the collecting station for stacking the product on the collecting carrier. The empty or possibly partially empty trays are conveyed back to the pallet warehouse 5 or to a rack position.

The invention claimed is:

1. A method for collecting a number of different products listed in an order in a product collecting system, the product collecting system comprising a pallet warehouse for storage therein of product carriers, including pallets, carrying products, a product warehouse comprising a number of racks extending parallel to each other, each rack comprising a number of rack positions arranged beside and above each other for storage therein of a product, and a number of collecting stations for collecting products listed in an order on a collecting carrier, characterized in that a plurality of modules are defined in the product collecting system, each module at least comprising a number of adjacent rack positions of at least one rack of the number of racks and at least one collecting station of the number of collecting stations, the order comprising products of a "slow-moving" type and products of a "fast-moving" type, the latter products being products which are needed relatively often for orders in comparison with products of the "slow-moving" type, the method comprising the steps of:
   a) allocating the order to one of the modules;
   b) collecting all the products listed in the order in rack positions of the module, to which end at least the following steps are carried out,
   b1) determining whether one of the products listed in the order is already available in one of the rack positions of the module and allocating the product to the order if the product is already available in the module, or, when one of the products listed in the order is not already available in one of the rack positions of the module, determining if the product is of a "slow-moving" type or of the "fast-moving" type needed for orders relatively more often in comparison with those of the "slow-moving" type,
   b2) determining if the product is available in another module when the product is of the "slow moving" type and allocating the product to the order when the product is of the "slow-moving" type and not available in the module but available in the other module and moving the product to one of the rack positions of the module from the other module, or, when the product is of the "slow-moving" type and not already available in the module nor in another module, allocating the product to the order from a product carrier carrying the product and moving the product to one of the rack positions of the module, or when the product is of the "fast-moving" type and not already available in the module, allocating the product from a product carrier carrying the product and moving the product to one of the rack positions of the module,
   c) releasing the order when all the products listed in the order have been collected in rack positions of the module and been allocated to the order, conveying the products to the collecting station of the module, and loading the products onto at least one collecting carrier at the collecting station.

2. The method according to claim 1, wherein the product collecting system comprises a collect-supply conveyor for each module, which conveyors are designed for conveying products directly from the racks of the modules to the collecting stations, and, as part of step c), conveying the products listed in the order, which have been collected in rack positions of the rack, directly to the collecting station of the module by means of one of the collect-supply conveyors.

3. The method according to claim 1, wherein, other products remaining on the product carrier that have not been allocated to an order are moved from the product carrier and distributed to the plurality of modules of the product warehouse.

4. The method according to claim 1, wherein a product carrier is unloaded onto trays designed for carrying at least one product, which trays carrying at least one product are stored in rack positions in the product warehouse, wherein a product is taken from one of the trays during the aforesaid method step c) in order to be loaded onto the collecting carrier.

5. The method according to claim 1, wherein the number of modules in the product warehouse are arranged in a row of n modules indicated by incremental index numbers 1-n, wherein a first one-way product conveyor having a conveying direction that extends in the direction of the incremental index numbers, and a second one-way product conveyor having a conveying direction that extends in the opposite direction of the incremental index numbers, extend along the row of n modules, each conveyor comprising, at the location of each module, a device for moving a product from the respective conveyor to a rack of the module and vice versa, wherein, when a product of the "slow-moving" type is moved from another module to the module in method step b2), the product is to that end moved either from the other module to the module by means of the first conveyor if the index number of the other module is lower than that of the module, or from the other module to the module by means of the second conveyor if the index number of the further module is higher than that of the module.

6. The method according to claim 5, wherein the first conveyor is also used for moving products directly coming from a product carrier to the number of modules.

7. The method according to claim 6, wherein the module comprises at least two adjacent racks.

8. A product collecting system for collecting a number of different products listed in an order, the product collecting system comprising a pallet warehouse for storage therein of product carriers, including pallets, carrying products, a product warehouse comprising a number of racks extending parallel to each other, each rack comprising a number of rack positions arranged beside and above each other for storage therein of a product, and a number of collecting stations for collecting products listed in an order on a collecting carrier, wherein a plurality of modules are defined in the product collecting system, each module at least comprising a number of adjacent rack positions of at least one rack of the number of racks and at least one collecting station of the number of collecting stations, the order comprising products of a "slow-moving" type and products of a "fast-moving" type, the latter products being products which are needed relatively often for orders in comparison with products of the "slow-moving" type, the product collecting system further comprising a control system configured to fill the order by:
  a) allocating the order to one of the modules;
  b) causing all the products listed in the order to be collected in rack positions of the module, to which end the control means are at least designed for,
    b1) determining whether one of the products listed in the order is already available in one of the rack positions of the module and allocating the product to the order if the product is already available in the module, or, when one of the products listed in the order is not already available in one of the rack positions of the module, determining if the product is of a "slow-moving" type or of the "fast-moving" type needed for orders relatively more often in comparison with those of the "slow-moving" type,
    b2) determining if the product is available in another module when the product is of the "slow-moving" type and is not available in the module but is available in the other module and causing the product to be moved to one of the rack positions of the module from the other module, or, when the product is of the "slow-moving" type and is not already available in the module nor in another module allocating the product to the order from a product carrier carrying the product and causing the product to be moved to one of the rack positions of the module, or, when the product
    is of the "fast-moving" type and not already available in the module allocating the product from a product carrier carrying the product and causing the product to be moved to one of the rack positions of the module,
  c) releasing the order if it is determined that all the products listed in the order have been collected in the module and been allocated to the order, causing the products allocated to the order to be conveyed to the collecting station of the module, and causing the products to be loaded onto at least one collecting carrier at the collecting station.

9. The product collecting system according to claim 8, wherein the number of modules in the product warehouse are arranged in a row of modules, wherein a first one-way product conveyor having a first conveying direction and a second one-way product conveyor having a second conveying direction opposed to that of the first conveying direction extend along the row of modules, each conveyor comprising, at the location of each module, a device for moving a product from the respective conveyor to one of the racks of the module, and vice versa.

10. The product collecting system according to claim 9, wherein the first one-way conveyor is designed for conveying products from the pallet warehouse to the product warehouse and for conveying products between individual modules, and wherein the second one-way conveyor is designed at least for conveying products between individual modules.

11. The product collecting system according to claim 8, wherein the product collecting system comprises, for each module, a collect-supply conveyor designed for conveying products directly from the racks of the modules to the collecting stations.

12. A product collecting system for collecting products listed in an order, the system comprising:
  a storage warehouse containing warehoused product;
  a product warehouse also containing the warehoused product and having a plurality of modules;
  a control system configured to fill the order by:
    a) assigning the order to a module of the plurality of modules;
    b) determining if the ordered product is of a "slow-moving" type or of a "fast-moving" type needed for orders relatively more often in comparison with those of the "slow-moving" type;
    c) determining if the warehoused product matching the ordered product is available in another module of the plurality of modules when the ordered product is of the "slow-moving" type and the warehoused product is not already available in the module assigned to the order, and allocating the warehoused product to the order when the ordered product is of the "slow-moving" type and the warehoused product is available in another module, or, when the ordered product is of the "slow-moving" type and the warehoused product is not available in another module, allocating the warehoused product to the order from the storage warehouse to the module assigned to the order, or when the ordered product is of the "fast-moving" type and the warehoused product is not available in the module assigned to the order, allocating the ordered product from the storage warehouse to the module assigned to the order;
    e) releasing the order from the module assigned to the order when all of the available warehoused products allocated to the order have been collected.

13. A method for collecting ordered products listed in an order, the method comprising the steps of:
  a) assigning the order to a module of a plurality of modules in a product collecting system;
  b) determining whether the ordered product is of a slow-moving type or of a fast-moving type needed for orders relatively more often in comparison with those of the slow-moving type;
  c) determining whether product matching the ordered product is available in another module of the plurality of modules when the ordered product is of the slow-moving type and the product is not already available in the module assigned to the order, and allocating the product to the order when the ordered product is of the slow-moving type and the product is available in another module or, when the ordered product is of the slow-moving type and the product is not available in another module, allocating the product to the order from another location to the module assigned to the order, or when the product is of the fast-moving type and the product is not available in the module assigned to the order, allocating the product from another location to the module assigned to the order, and e) releasing the order from the module assigned to the order when all of the available products allocated to the order have been collected.

14. The method of claim 13 further comprising the step of moving the collected product from the module assigned to the order to a collection station.

\* \* \* \* \*